(12) United States Patent
Balestra

(10) Patent No.: US 8,255,171 B2
(45) Date of Patent: Aug. 28, 2012

(54) METHOD AND SYSTEMS FOR ESTIMATING REMAINING SERVICE LIFE OF A COMPONENT SUBJECT TO STRESS

(75) Inventor: Chester Lee Balestra, University City, MO (US)

(73) Assignee: The Boeing Company, Chicago, IL (US)

( * ) Notice: Subject to any disclaimer, the term of this patent is extended or adjusted under 35 U.S.C. 154(b) by 897 days.

(21) Appl. No.: 12/259,450

(22) Filed: Oct. 28, 2008

(65) Prior Publication Data

US 2010/0106430 A1   Apr. 29, 2010

(51) Int. Cl.
*G06F 19/00* (2011.01)
*G06F 17/40* (2006.01)

(52) U.S. Cl. .............. 702/35; 702/34; 702/42; 703/2; 703/7

(58) Field of Classification Search .............. 702/35, 702/34, 42
See application file for complete search history.

(56) References Cited

U.S. PATENT DOCUMENTS

| | | | |
|---|---|---|---|
| 5,140,528 A * | 8/1992 | Swaminathan et al. ........ | 702/34 |
| 6,634,236 B2 * | 10/2003 | Mars .............. | 73/799 |
| 7,013,224 B2 * | 3/2006 | Landry et al. ........... | 702/35 |
| 7,143,007 B2 | 11/2006 | Long et al. | |
| 7,162,373 B1 * | 1/2007 | Kadioglu et al. ............. | 702/35 |
| 7,328,128 B2 | 2/2008 | Bonanni et al. | |
| 7,403,871 B2 | 7/2008 | Papadimitriou et al. | |
| 7,715,991 B2 * | 5/2010 | Potdar et al. ............ | 702/34 |
| 2008/0004839 A1 | 1/2008 | Papadimitriou et al. | |
| 2009/0133381 A1 * | 5/2009 | Holmes et al. ......... | 60/204 |

\* cited by examiner

*Primary Examiner* — Hal Wachsman
(74) *Attorney, Agent, or Firm* — Yee & Associates, P.C.

(57) ABSTRACT

A method for determining when a ceramic component on a platform should be replaced. The method includes determining parameters for the ceramic component, the parameters include empirically determined a critical stress intensity factor, and a geometry factor for the ceramic component. The method also includes determining a relationship between platform operational parameters to the generation of stress at the surface of interest of the ceramic component, determining an initial crack size of a crack within the ceramic component at installation, tracking operational parameters of the platform throughout a course of usage of the ceramic component, calculating the corresponding stress at the crack location due to the tracked operational parameters, and calculating a numerical solution that illustrates a crack growth rate velocity and tracks a size of the crack over time. The ceramic component is replaced based on the crack growth rate velocity and the size of the crack.

18 Claims, 7 Drawing Sheets

METHOD AND SYSTEMS FOR ESTIMATING REMAINING SERVICE LIFE OF A COMPONENT SUBJECT TO STRESS

BACKGROUND

The field of the invention relates generally to failure prediction and avoidance, and more specifically, to methods and systems for estimating remaining service life of a ceramic component subject to stress.

Predicting component failure due to stress induced crack growth from surface flaws introduced by original fabrication processes and/or through operation is difficult. However, if a good estimate of time-to-failure could be developed, a good estimate of an optimal time-to-retire is easily attained.

Currently, conservative estimates for useful service life are used to determine a time-to-retire for such components, based on experience as well as over designing of the component by specifying, for example, greater-than-necessary dimensions. However, there are disadvantages and limitations to such existing solutions. For example, over design of component thickness may result in greater size and weight load to a platform, as well as reduced transmission through a component such as a ceramic sensor window. Reduced transmission capability degrades a signal-to-noise ratio of a corresponding sensor system. In addition, a need for increased signal processing is created as are increased size, weight, and power requirements associated with this type of processing.

BRIEF DESCRIPTION

In one aspect, a method for determining when a ceramic component on a platform should be replaced is provided. The method includes determining the parameters $v_o$, $K_c$, n, and $\psi_r$ for the component, where $v_o$ and n are empirically determined parameters, $K_c$ is a critical stress intensity factor, $\psi_r$ is a geometry factor for the material in the form of the component, determining a relationship of between platform operational parameters to the generation of stress at the surface of interest of the component, determining an initial crack size of a crack within the component at installation, tracking operational parameters of the platform throughout a course of usage of the component, calculating the corresponding stress at the crack location due to the tracked operational parameters, and calculating a numerical solution that illustrates a crack growth rate velocity and tracks a size of the crack over time.

In another aspect, a system for estimating a remaining service life for a component deployed on a platform is provided which includes a computer and a database accessible by the computer. The database includes data relating to $v_o$, $K_c$, n, and $\psi$r for the component, where $v^o$, and n are empirically determined parameters, $K_c$ is a critical stress intensity factor, $\psi$r is a geometry factor for the material in the form of the component, a relationship between platform operational parameters and the generation of stress at a surface of interest of the component. The computer is programmed to track operational parameters of the platform throughout deployment of the component, calculate the corresponding stress on the component due to the tracked operational parameters, and calculate a numerical solution that illustrates a crack growth rate velocity and tracks a size of a crack within the component over time.

In still another aspect, a computer is provided that is programmed to utilize component related parameters along with a measurement of a flaw in the component to determine a relationship between platform operational parameters and the generation of stress at the location of the flaw, calculate the corresponding stress on the component due to the platform operational parameters, and calculate a numerical solution that illustrates a crack growth rate velocity and tracks changes in the size of the flaw within the component over time, based on the stress calculations.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings.

DETAILED DESCRIPTION

The described embodiments relate to systems and methods that utilize platform sensor data to determine and track service life expenditure in ceramic components, for example, an aircraft window, due to operational stress. The described embodiments also relate to systems and methods to utilize the platform sensor data that is available to predict remaining service life. To reiterate, the described embodiments analyze platform sensor data to determine a service life expenditure of a ceramic component, such as a window, and are further operable to predict a remaining service life for the ceramic components, as well as an optimum time for replacement of the ceramic components. A platform as mentioned, may include, without limitation, a flight platform, space platform, land platform, ocean surface platform, or submersible platform. For example, a platform may be an aircraft, missile, automobile, spacecraft, submarine, ocean vessel, or a fixed structure.

Figure 1:
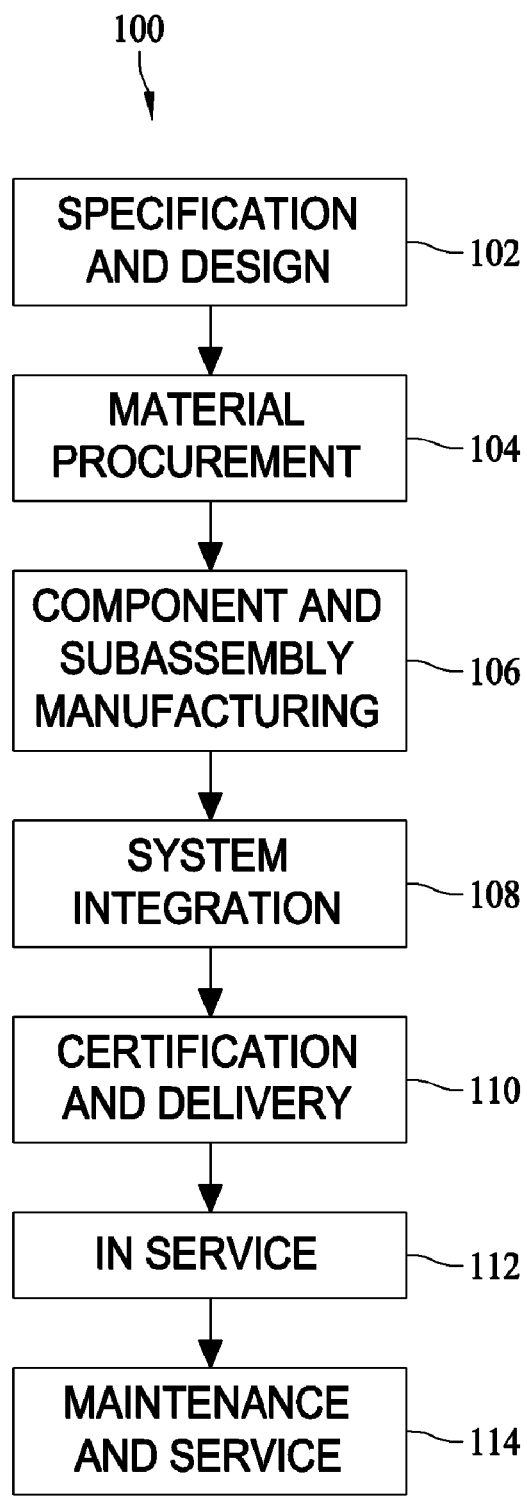
FIG. 1 is a flow diagram of an aircraft production and service methodology.
Figure 2:
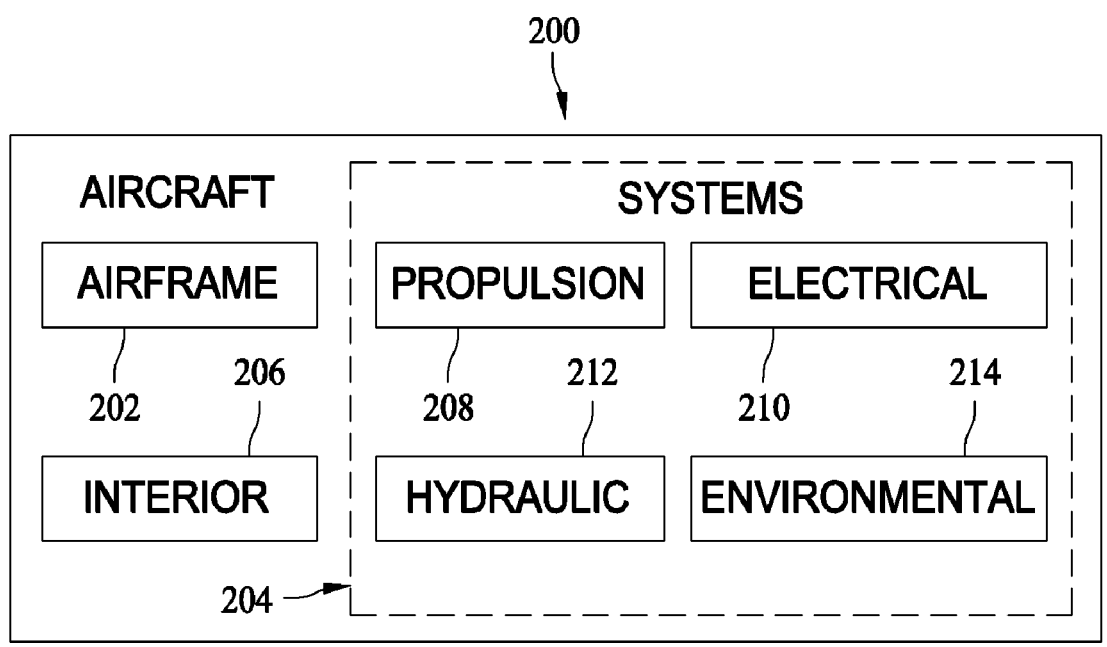
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
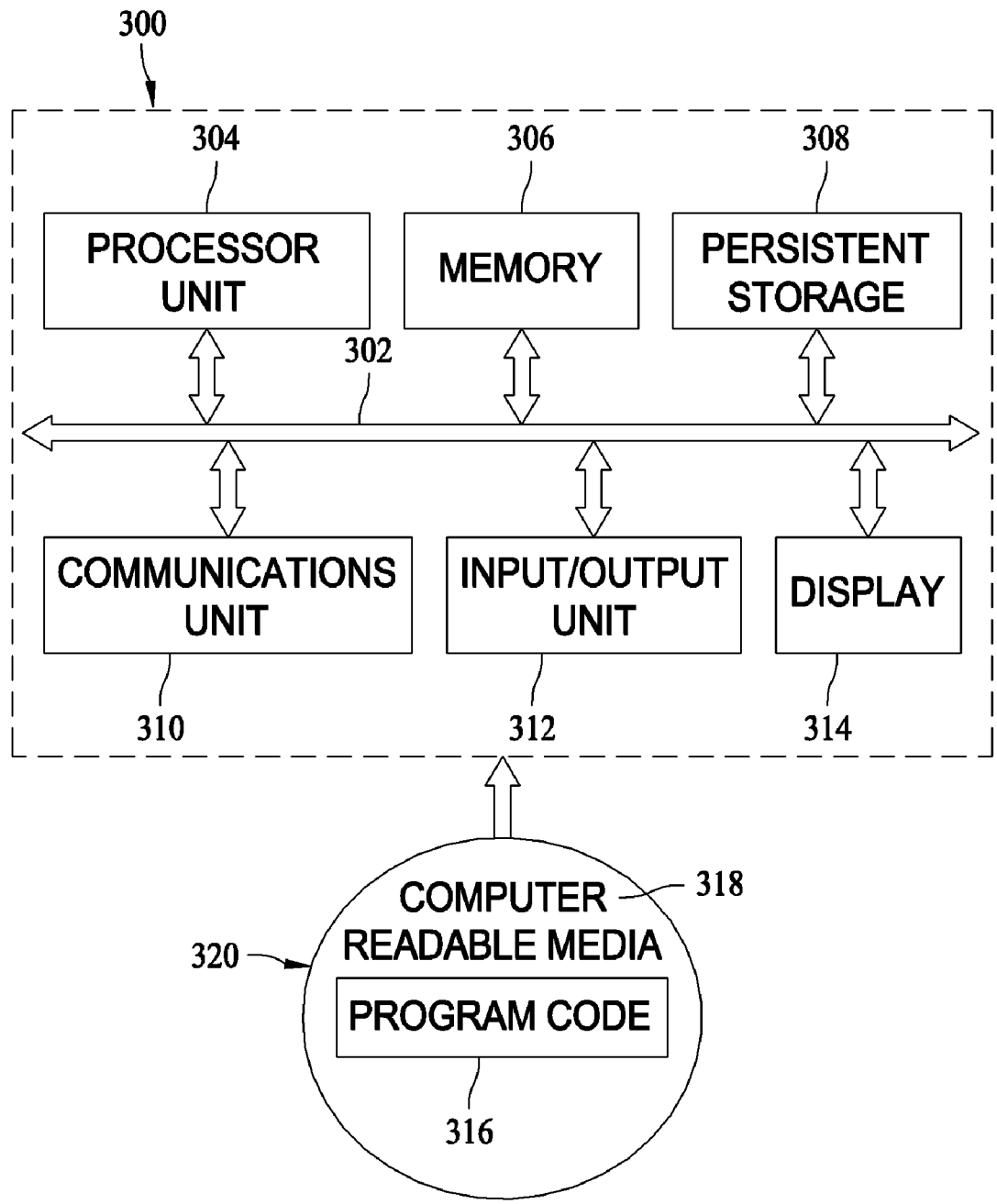
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is configured to store information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the described embodiment is operable for prediction of a service life for ceramic components based on an actual operational stress history or an anticipated future operational stress. For example, in this embodiment, instructions may be loaded into memory 306 such that processor 304 is programmed to track operational parameters of a platform throughout deployment of a component, calculate corresponding stress on the component based on the tracked parameters, and calculate a numerical solution that illustrates a crack growth rate velocity and tracks a size of a crack within the component over time. The storage device memory 306 or persistent storage 308 may have a database including data relating to component related parameters and data relating platform operational parameters and the generation of stress at a surface of interest of the component. In other embodiments, this database may be loaded through computer readable media 318, or may be accessed through communications fabric 302. In yet other embodiments, processor 304 may be platform-based and programmed to use anticipated operational parameters for the platform to generate an anticipated crack growth rate and calculate an anticipated life for the component.

Such predictions provide data such that a more accurate design of component geometry can be generated for future versions of such ceramic components, based on material properties and on anticipated operational stress.

As described above, existing service life prediction solutions do not make use of available sensor data to determine the actual amount of service life expended through true usage. The described embodiments provide an improvement as they permit an extension of service life for certain components based on low stress level usage. At least one result is reduced material and maintenance costs. The described embodiments also determine if and when an exceptionally high stress level usage has occurred and therefore warrants what might ordinarily be considered a premature replacement, but a replacement that can circumvent a potential failure in the future.

Although total prevention of ceramic component surface damage in operational environments is impractical, if not impossible, crack growth and time-to-failure predictions can be made through the application of the principles of fracture mechanics. Time-to-failure analyses of the interrelationships among environmental humidity and salinity levels, operational stress and stress duration, and component material properties is performed as a part of component design and during component operational life to determine an optimum time of retirement and replacement.

Surface cracks occur in ceramic components, such as sensor windows on aircraft, as a part of the fabrication. Examples include scratches and digs formed from the lapping and polishing process for a window or lens. These flaws are also induced by the operational environment. A crack size $c_o$ at formation may be determined from inspection. The crack growth process may be described by the differential equation shown in equation (1), where c is the crack size, $v_o$ and n are empirically determined parameters.

$$\frac{dc}{dt} = v_o\left(\frac{K}{K_c}\right)^n = v_o\left(\left(\frac{c}{c_o}\right)^{-3/2} + \frac{\psi_r \sigma_a c_o^{1/2}}{K_c}\left(\frac{c}{c_o}\right)^{1/2}\right)^n \quad (1)$$

In equation (1), K is the stress intensity factor, a measure of the increased level of stress in the crack vicinity due to the component and crack geometry, and $K_c$ is the critical stress intensity factor, or toughness, value, at which material failure can occur and terminate the crack growth process. $c_o$ is the crack size at its formation; $\psi r$ is a geometry factor, equal to $2/\sqrt{\pi}$ for a flat surface; $\sigma a$ is the level applied tensile stress at the location of the crack, which is determined by environmental conditions and thus may be a function of time.

Figure 4:
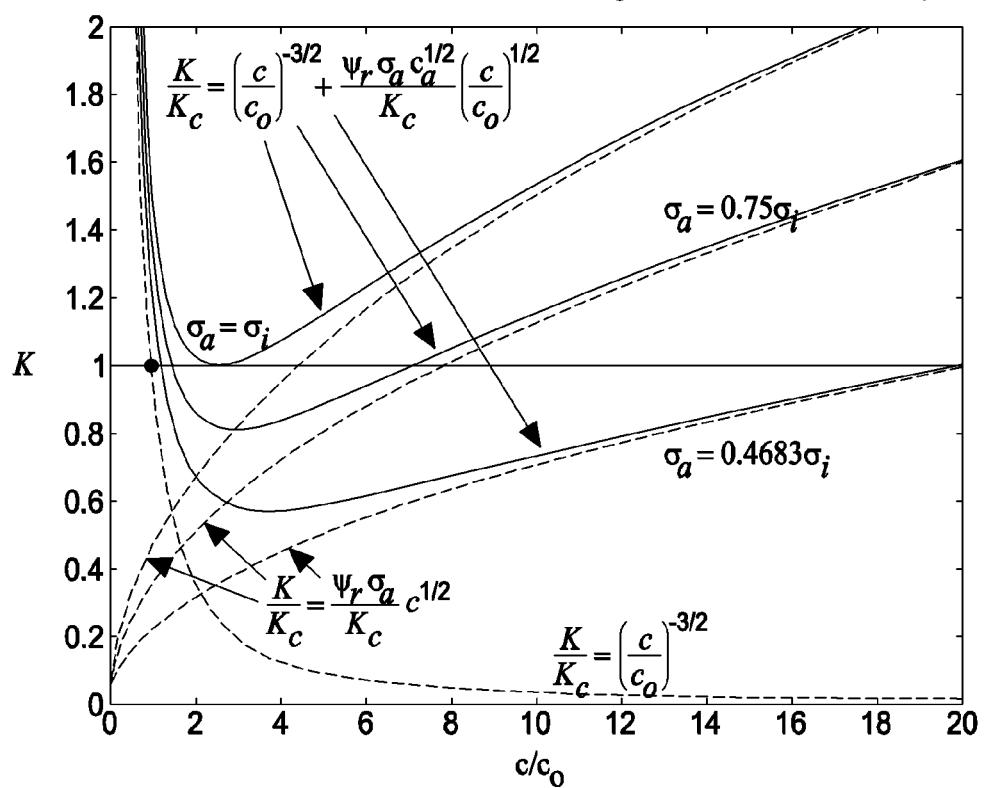
FIG. 4 is a graph which illustrates a normalized stress intensity factor $K/K_c$ as a function of normalized crack size $c_o$.

The relationship between the ratio $K/K_c$ and the sum inside of the outer parentheses in equation (1) is depicted in FIG. 4, which illustrates as an example only, a normalized stress intensity factor $K/K_c$ as a function of normalized crack size $c_o$. For sufficiently small values of initial crack size $c_o$, the stress intensity factor K decreases with increasing crack size. In the absence of any applied stress, the crack size at formation ($c=c_o$) may have a K value equal to $K_c$, as indicated by equation (1) and shown by the black dot in FIG. 4. In the absence of stress, crack growth beyond initiation may proceed relatively slowly in accordance with a t2/(3n+2) power law, where n typically ranges from 10 to 40 depending upon the material. As stress is applied, the black dot moves to the right to one of the solid curves, depending upon the value of the applied stress. Note that for $\sigma a>\sigma i$, $K>K_c$ at the minimum and further to the right. For such a situation K will subsequently always be greater than $K_c$ and the material fractures at the crack. This inert strength $\sigma i$ may be defined by equation (2) and is the applied stress level which results in instantaneous catastrophic failure. For smaller values of applied stress, the crack size will increase along its respective curve with decreasing K until a minimum is reached. Beyond this minimum, c increases back up toward the line defined by $K/K_c=1$, where failure finally occurs.

$$\sigma i = \frac{3K_c}{4^{3/4} \psi_r c_o^{1/2}} \quad (2)$$

The evolution of c, dc/dt, and K/K$_c$ in time may be determined from a numerical solution of equation (1). Such a solution permits these parameters to be followed even if applied stress is a varying function of time.

Figure 5A:
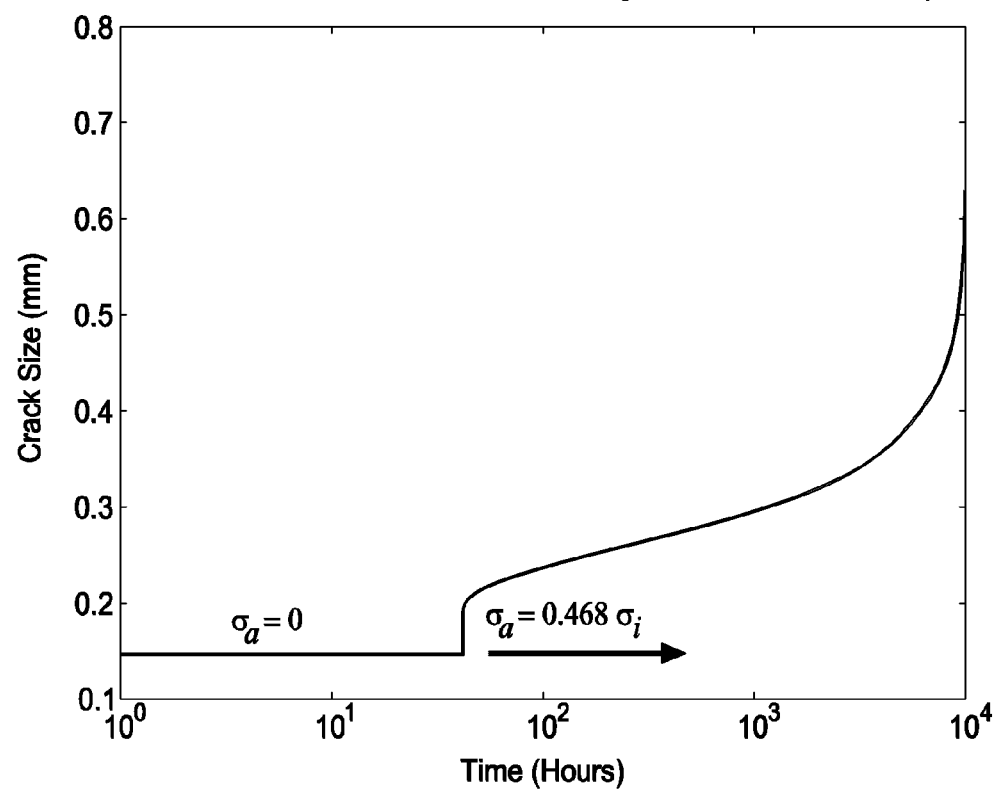
FIG. 5A is a graph that depicts crack size, c, as a function of time.
Figure 5B:
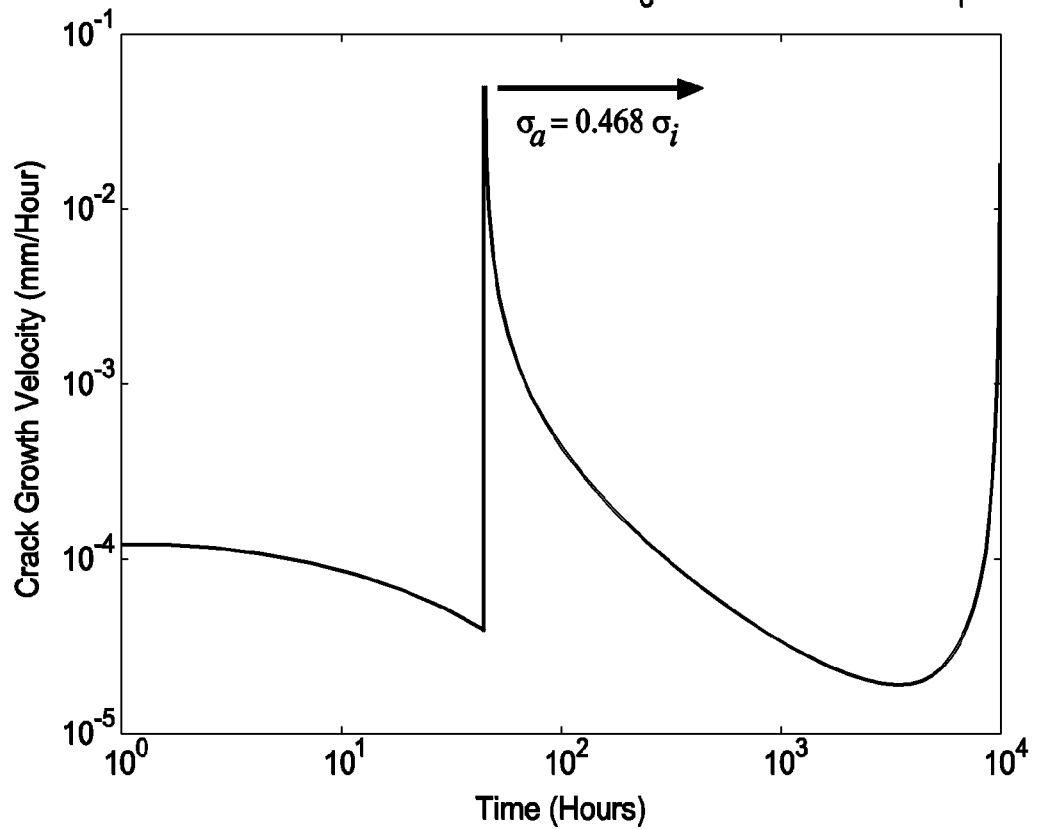
FIG. 5B is a graph that depicts crack growth velocity, dc/dt, as a function of time.

FIG. 5A is a graph example that depicts crack size c, and FIG. 5B is a graph example that depicts crack growth velocity dc/dt, as a function of time, for c$_o$=0.1 mm. For the first 50 hours applied stress is zero, at which time it is changed to 0.468$\sigma_i$=12.37 MPa. FIGS. 5A and 5B show solutions obtained from the application of equation (1) for a hypothetical situation where a crack of 0.1 mm was formed and the material was allowed to sit at zero applied stress for 50 hours, at which time a stress of just less than 50% of the inert strength stress was turned on. Crack size and crack growth velocity were tracked until material fracture occurred after about 10,000 hours. By tracking growth velocity to a shallow minimum as indicated by its time profile, an appropriate retirement time may be determined, with adequate safety margin before the rapid and end-of-life interval at the far right. Although the time of this growth velocity minimum varies with stress level, it always shows a broad minimum which provides a high temporal tolerance for the selection of the appropriate retirement time.

As mentioned elsewhere herein, operational stress values for such ceramic components as a window on a platform may be determined from onboard sensor subsystems. For example, for an aircraft window, stress may be calculated from the sum total of three influences (1) the difference in pressure between the two sides the window, (2) the incident velocity of air at the outside of the window; (3) any g force on the window from acceleration or deceleration.

Pressure altitude, velocity, and acceleration/deceleration are routinely tracked by aircraft instrumentation. These data may be recorded for after flight analysis for stress tracking, or the platform computer may compute stress in real time from this data as it relates to stress through predetermined transformation relationships. A track velocity profile is then inspected in order to determine if a crack growth velocity minimum has been reached. In addition, the stress profile estimate for a future mission can then be simulated and analyzed to determine if there might be any hazard of a component failure.

Figure 6:
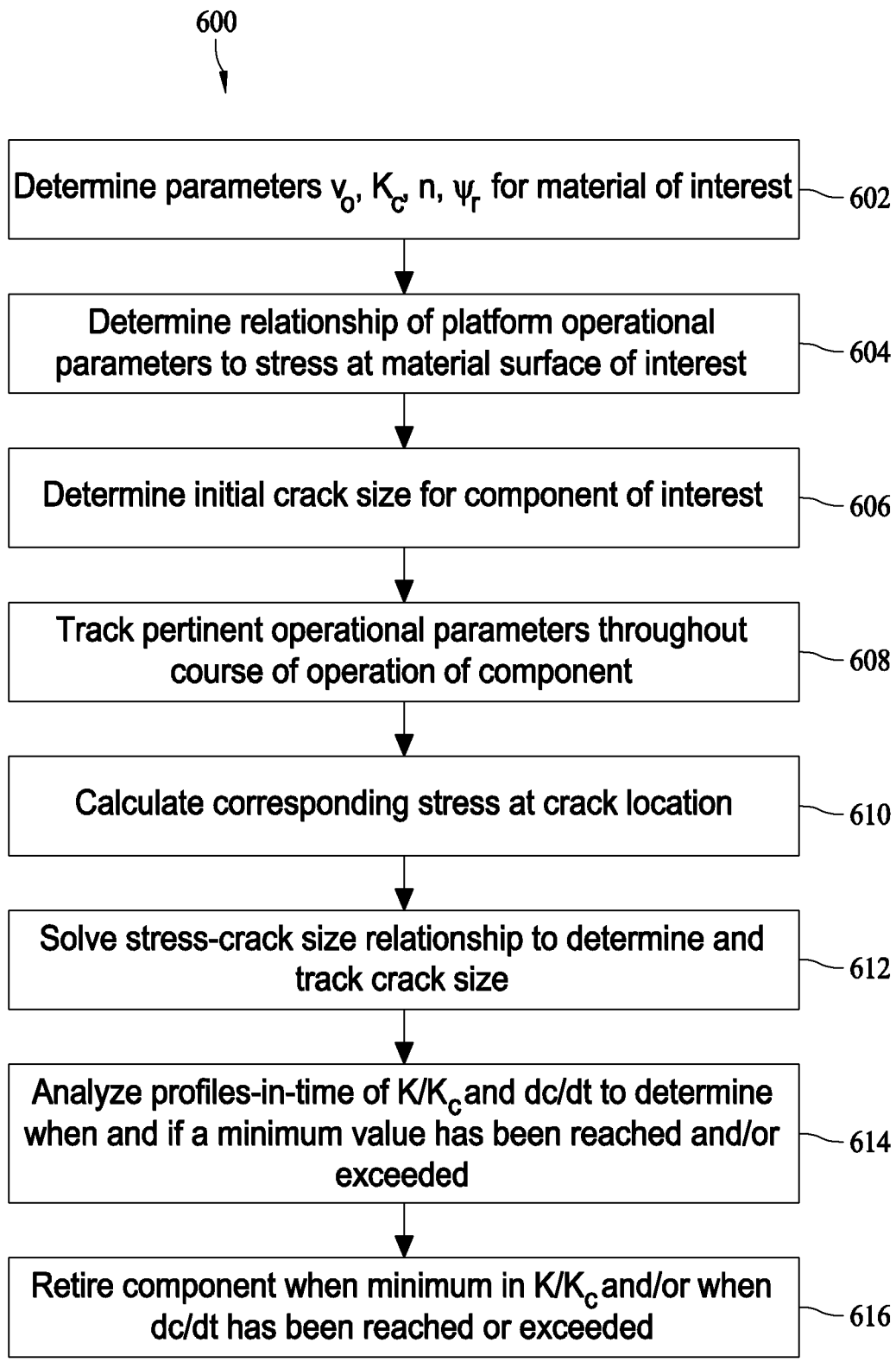
FIG. 6 is a flowchart illustrating a process for determining a remaining service life for a component.

In one embodiment, a process is provided which is illustrated by the flowchart 600 of FIG. 6. The process illustrated by the flowchart 600 includes determining 602 the parameters v$_o$, K$_c$, n, and $\psi_r$ for the material of interest. The first three parameters may be generally available from the published literature relating to the material of interest. However, if these first three parameters are not available, they may be measured from test samples of the material. The fourth parameter, $\psi_r$, is determined from the geometry of the material in its component form. For example, a crack on a planar window surface would have a $\psi_r$ value of $2/\sqrt{\pi}$=1.12838. A determination 604 of the relationship of between platform operational parameters, such as temperature, pressure altitude, velocity, and acceleration to the generation of stress at the surface of interest for the component, or crack location is then made. An initial crack size within the component at installation may be determined 606 based upon at least one of an inspection and data provided by a supplier of the component.

Pertinent operational parameters are tracked 608 throughout the course of usage of the component. As mentioned above, some of these operational parameters may include temperature, pressure altitude, velocity, and acceleration. The corresponding stress at the crack location is calculated 610 and the numerical solution of the crack growth rate velocity differential equation, Equation (1) above, may be used to calculate 612 and track crack size c and K/K$_c$, or dc/dt, as a function of time. The solution process may be performed in real time by a platform computer during platform operation using data from sensors associated with the platform, or it may be performed after operation from recorded parametric data.

Analysis 614 of the profiles of K/K$_c$, or dc/dt, may be calculated as a function of time to determine if a minimum value has been reached and the derivative, or slope of the profile, has become positive. This is an indication that further increases of these slopes, preceding eventual component failure, are imminent and that the component should be replaced 616. A correlation may be made with calculated crack size and with an inspection of the component for any visible cracks.

Further simulative analyses may be made for anticipated operational stress profiles of future, anticipated missions in order to determine the most probable future evolution of crack growth during those missions and if and when there might be a future hazard of component failure. Anticipated operational parameters for a platform may be used to generate an anticipated crack growth rate and calculate an anticipated life for a component. For example, K/Kc and dc/dt profiles-in-time may be utilized as a predictive mission planning tool for estimating an ability of a component to survive a future mission scenario. In yet another application, K/Kc and dc/dt profiles-in-time may be utilized as a predictive maintenance planning tool for pre-determination of an opportune time for component replacement or service.

In light of the above, after analysis of the K/Kc and/or dc/dt profile-in-time, a user has the options of retiring the component, not retiring the component and proceeding as normal, extrapolating the profiles-in-time as an estimate of component endurance of a future intended mission, and extrapolating the profile and coordinating with maintenance planning scheduler(s) to select an optimum maintenance time slot before failure occurs.

In at least one aspect, the described embodiments disclose a method for utilizing platform sensor data to determine and track service life expenditure in a ceramic component, such as a window, due to operational stress and to utilize available sensor data to predict remaining service life. Specifically, the platform sensor data, along with material specific data, is utilized to determine service life expenditure of a ceramic component, such as a window, and can be used to predict a remaining service, as well as an optimum time for component replacement.

At least one problem solved by the embodiments include predicting of aircraft, missile, or other flight platform window time-to-failure due to stress induced crack growth from surface flaws introduced by original fabrication processes and/or through operation. Through the development of a reliable estimate of time-to-failure, a good estimate of an optimal time-to-retire and therefore a method for preventing any failure and still maximizing the useful service life of the window is also provided.

The embodiments are an improvement over the existing solutions which generally consist of conservative estimates for useful service life based on experience as well as over design of the component by specifying greater-than-necessary dimensions. The embodiments also help to eliminate an over design of window thickness, which results in reductions in size and weight load to the flight platform, as well as reduced transmission losses through the window, and reduced power needed in the systems that transmit through such windows.

This written description uses examples to disclose various embodiments, including the best mode, and also to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for determining when a ceramic component of a platform should be replaced, said method comprising:
   determining parameters comprising $v_o$, $K_c$, n, and ψr for the ceramic component, where $v_o$ and n are empirically determined based on the ceramic component, $K_c$ is a critical stress intensity factor, and ψr is a geometry factor for the ceramic component;
   receiving, at a processor, the parameters, platform operational parameters, and measurements associated with generation of stress at a surface of interest of the ceramic component;
   determining, using the processor, a relationship between the platform operational parameters and the measurements associated with generation of stress at the surface of interest of the ceramic component;
   receiving, at the processor, an initial crack size of a crack within the ceramic component;
   tracking the platform operational parameters throughout a course of usage of the ceramic component, wherein tracked operational parameters are formed and stored on a non-transitory computer readable storage medium;
   receiving, at the processor, the tracked operational parameters;
   calculating, using the processor, the stress at the crack due to the tracked operational parameters;
   calculating, using the processor, a numerical solution that describes a crack growth rate and a size of the crack; and
   estimating, using the processor, when the ceramic component should be replaced based on the crack growth rate and the size of the crack.

2. The method according to claim 1 wherein calculating the numerical solution comprises solving an equation comprising:

$$\frac{dc}{dt} = v_o \left(\frac{K}{K_c}\right)^n = v_o \left(\left(\frac{c}{c_o}\right)^{3/2} + \frac{\psi_r \sigma_a c_o^{1/2}}{K_c} \left(\frac{c}{c_o}\right)^{1/2}\right)^n$$

where $c_o$ is the initial crack size, c is the size of the crack, K is a stress intensity factor, and $\sigma_a$ is a level of applied tensile stress at the crack.

3. The method according to claim 2 wherein the level of applied tensile stress is a function of time.

4. The method according to claim 2 further comprising:
   analyzing profiles of at least one of $K/K_c$ and a derivative comprising dc/dt as a function of time to determine if a minimum value of the K/Kc has been reached or the derivative has become positive.

5. The method according to claim 1 wherein determining the parameters $v_o$, $K_c$, n, and ψr for the ceramic component comprises determining $v_o$, $K_c$, and n from at least one of published literature relating to the ceramic component and measurements of test samples of material comprising the ceramic component.

6. The method according to claim 1 wherein tracking the platform operational parameters of the platform comprises:
   tracking at least one of temperature, pressure altitude, velocity, and acceleration using data from sensors connected to the platform; and wherein calculating the stress includes using the data.

7. The method according to claim 1 wherein determining the initial crack size comprises at least one of:
   determining the initial crack size based on an inspection of the crack; and
   using initial crack size data supplied by a supplier of the ceramic component.

8. The method according to claim 1 wherein calculating the stress and calculating the numerical solution are performed as one or both of a real time calculation by a platform computer during platform operation and after platform operation.

9. The method according to claim 1 further comprising:
   using anticipated operational parameters for the platform to generate an anticipated crack growth rate and to calculate an anticipated life for the ceramic component.

10. The method according to claim 9 further comprising:
   planning maintenance for the platform based on the anticipated life.

11. A system for estimating a remaining service life for a component deployed on a platform, said system comprising a computer and a non-transitory computer readable storage medium storing a database accessible by said computer:
   said database including first data comprising parameters comprising $v_o$, $K_c$, n, and ψr for the component, where $v_o$ and n are empirically determined parameters based on the component, $K_c$ is a critical stress intensity factor, and ψr is a geometry factor for the component, and wherein the database further includes second data comprising a relationship between platform operational parameters and measurements associated with generation of stress at a surface of interest of the component;
   said computer configured to receive the first data and the second data, to track operational parameters of the platform during deployment of the component, wherein after tracking the operational parameters the computer is further configured to store tracked operational parameters, and wherein the computer is further configured to calculate a stress on the component due to the tracked operational parameters, and calculate a numerical solution that describes a crack growth rate and a size of a crack within the component; and
   wherein said computer is further configured to estimate the remaining service life for the component based on the crack growth rate and the size of the crack.

12. The system according to claim 11 wherein, to calculate the numerical solution, said computer is further programmed to solve an equation comprising:

$$\frac{dc}{dt} = v_o \left(\frac{K}{K_c}\right)^n = v_o \left(\left(\frac{c}{c_o}\right)^{-3/2} + \frac{\psi_r \sigma_a c_o^{1/2}}{K_c} \left(\frac{c}{c_o}\right)^{1/2}\right)^n$$

where $c_o$ is an initial crack size, c is the size of the crack, K is a stress intensity factor, and $\sigma_a$ is a level of applied tensile stress at the crack.

13. The system according to claim 12, wherein said computer is further programmed to analyze profiles of at least one of K/Kc and a derivative comprising dc/dt as a function of time to determine if a minimum value of the K/Kc has been reached or the derivative has become positive.

14. The system according to claim 11 wherein, to track the platform operational parameters, said computer is further programmed to:

track at least one of temperature, pressure altitude, velocity, and acceleration using third data from sensors connected to the platform; and wherein calculating the stress includes using the third data.

15. The system according to claim 11 wherein said database includes third data comprising an initial crack size of the crack within the component at installation.

16. The system according to claim 11 wherein said computer comprises at least one of:

a platform-based computer further programmed to calculate the stress due to the tracked operational parameters and to calculate the numerical solution as a real time calculation during platform operation; and a computer programmed to calculate the stress due to the tracked operational parameters and to calculate the numerical solution after platform operation.

17. The system according to claim 11 wherein said computer is further programmed to use anticipated operational parameters for the platform entered into said computer to generate an anticipated crack growth rate.

18. The system according to claim 11 wherein said computer is further programmed to generate a maintenance plan for the platform based on the remaining service life.

\* \* \* \* \*